United States Patent [19]

Miki et al.

[11] Patent Number: 4,482,339
[45] Date of Patent: Nov. 13, 1984

[54] REDUCTION RATIO DETECTING MECHANISM FOR V-BELT TYPE CONTINUOUSLY VARIABLE TRANSMISSION

[75] Inventors: Nobuaki Miki, Kariya; Norio Sobue; Shoji Yokoyama, both of Anjo, all of Japan

[73] Assignee: Aisin Warner Kabushiki Kaisha, Aichi, Japan

[21] Appl. No.: 296,447

[22] Filed: Aug. 26, 1981

[30] Foreign Application Priority Data

Sep. 4, 1980 [JP] Japan .............................. 55-123033

[51] Int. Cl.³ ............................................. F16H 55/52
[52] U.S. Cl. ......................................... 474/28; 474/18
[58] Field of Search ....................... 74/689; 474/18, 28

[56] References Cited

U.S. PATENT DOCUMENTS

| | | | |
|---|---|---|---|
| 3,015,964 | 1/1962 | Noguchi | 474/28 X |
| 3,044,316 | 7/1962 | Forster | 474/18 X |
| 3,052,132 | 9/1962 | Dittrich et al. | 474/18 |
| 3,110,189 | 11/1963 | Steure | 474/18 |
| 3,395,586 | 8/1968 | Kirchner | 474/28 X |
| 4,369,675 | 1/1983 | Van Deursen | 474/28 X |

FOREIGN PATENT DOCUMENTS

| | | | |
|---|---|---|---|
| 2703488 | 8/1977 | Fed. Rep. of Germany | 474/28 |
| 2752322 | 6/1978 | Fed. Rep. of Germany | 474/18 |
| 2033502 | 5/1980 | United Kingdom | 474/18 |
| 2080892 | 2/1982 | United Kingdom | 474/18 |

*Primary Examiner*—Allan D. Herrmann
*Assistant Examiner*—Stephen B. Andrews
*Attorney, Agent, or Firm*—Cooper, Dunham, Clark, Griffin & Moran

[57] ABSTRACT

A reduction ratio detecting mechanism for V-belt type continuously variable transmission of this invention comprising a spool disposed with one end thereof projecting from a valve body containing said oil-hydraulic controller of said V-belt type continuously variable transmission and with the axis thereof in parallel with the axis of either one of said input and output pulleys and capable of providing a reduction ratio pressure corresponding to the amount of displacement of said spool, said reduction ratio pressure being applied to said oil-hydraulic controller, wherein the movable flange of said input pulley or said output pulley and said reduction ratio valve are connected by a connecting lever which is engaged, at one end thereof, with said movable flange so as to allow the turning of said movable flange and, at the other end thereof, with the projecting part of said spool, is capable of directly and accurately detecting the reduction ratio between the input and output shafts.

2 Claims, 11 Drawing Figures

REDUCTION RATIO DETECTING MECHANISM FOR V-BELT TYPE CONTINUOUSLY VARIABLE TRANSMISSION

BACKGROUND OF THE INVENTION

This invention relates to a V-belt type continuously variable transmission for vehicles and particularly relates to a reduction ratio detecting mechanism adapted to detect the reduction ratio between the input and output shafts for selectively supplying pressure oil to the oil-hydraulic control circuit of the V-belt type continuously variable transmission corresponding to the reduction ratio between the input and output shafts.

In a vehicle equipped with a V-belt type continuously variable transmission, the engine power consumption by the oil pump generating the oil pressure applied to the oil-hydraulic servo-system can be reduced and, thereby, improvement of the specific fuel consumption of the engine is possible when the oil pressure applied to the oil-hydraulic servo-system for driving the movable flange of the pulley controlling the reduction ratio is controlled to the lowest necessary pressure corresponding to the reduction ratio between the input and output shafts. For such a purpose, it is necessary to provide a reduction ratio detecting mechanism capable of converting the position of the movable flange corresponding to the reduction ratio into an oil-hydraulic signal.

SUMMARY OF THE INVENTION

Accordingly, an object of the present invention is to provide a reduction ratio detecting mechanism for a V-belt type continuously variable transmission, which detecting mechanism is capable of directly and accurately detecting the reduction ratio between the input and output shafts.

Another object of the present invention is to provide a reduction ratio detecting mechanism for a V-belt type continuously variable transmission, which detecting mechanism is designed to facilitate the adjustment of assembling disposition during the assembling operation and can be assembled with precision, thus capable of performing precision detection of the reduction ratio between the input and output shafts.

Still further object of the present invention is to provide a reduction ratio detecting mechanism for a V-belt type continuously variable transmission, which detecting mechanism comprises a simple constitution for detecting the reduction ratio between the input and output shafts and less liable to malfunction.

DETAILED DESCRIPTION OF THE PREFERRED EMBODIMENT

A reduction ratio detecting mechanism for a V-belt type continuously variable transmission embodied according to the present invention will now be described hereunder referring to the attached drawings.

Figure 1:
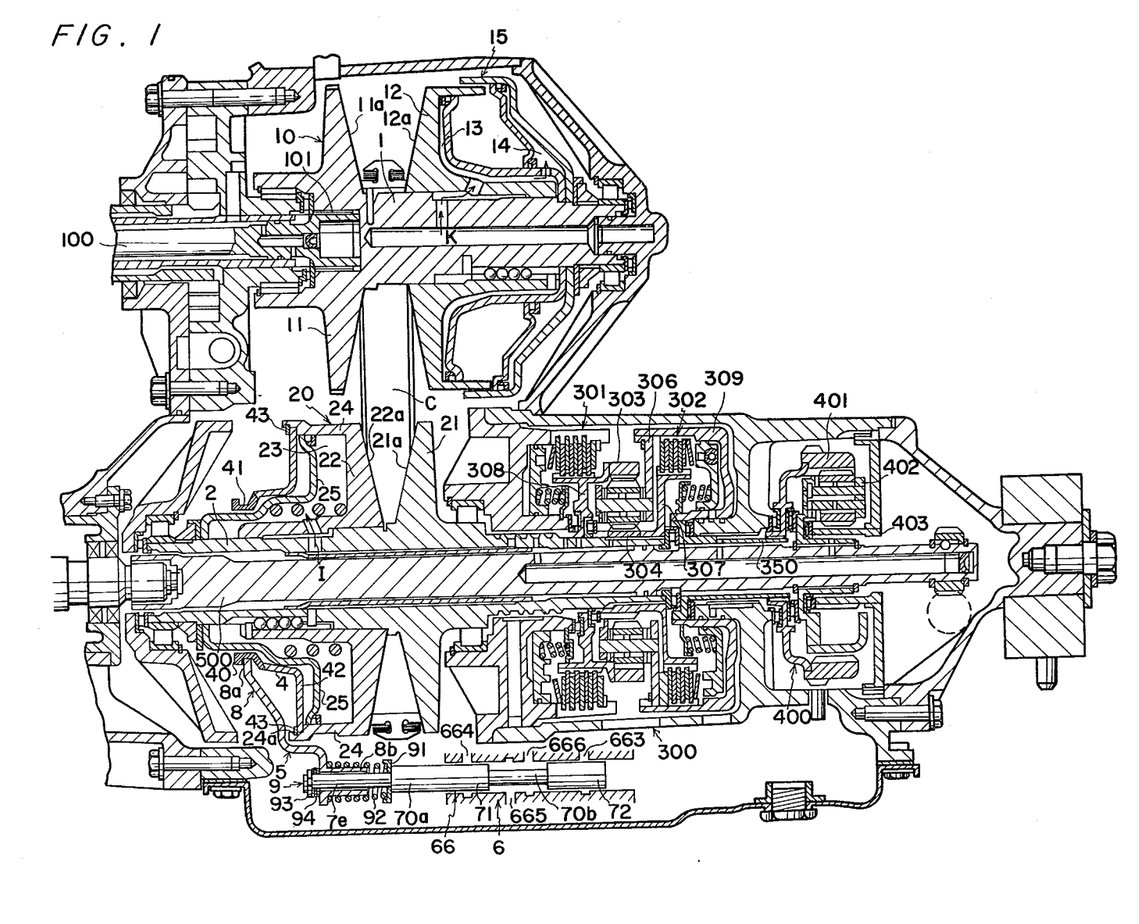
FIG. 1 is a sectional view of a V-belt type continuously variable transmission including a reduction ratio detecting mechanism according to the present invention.

An input pulley 10 comprises a fixed flange 11 having a conical surface 11a and being formed in a single unit with the input shaft 1 of the V-belt type continuously variable transmission and a movable flange 12 having a conical surface 12a forming a V-shaped space of a variable width together with the conical surface 11a of the fixed flange and being slidably fitted on the input shaft 1. The movable flange 12 is driven by an oil-hydraulic servo-mechanism 15 comprising oil chambers 13 and 14 to which pressure oil is supplied through an oil passage connected to an oil-hydraulic control device as shown by arrows K. An output pulley 20 comprises a fixed flange 21 having a conical surface 21a and being formed in a single unit with the output shaft 2 of the V-belt type continuously variable transmission and a movable flange 22 having a conical surface 22a forming a V-shaped space of a variable width together with the conical surface 21a of the fixed flange 21 and being slidably fitted on the output shaft 2. The movable flange 22 is driven by an oil-hydraulic servo-mechanism 25 comprising an oil chamber 23 to which pressure oil is supplied through an oil passage connected to the oil-hydraulic control device as shown by an arrow I. A transmission V-belt C is extended between the input pulley 10 and the output pulley 20. The input shaft 1 is coupled with an input transmission shaft 100 by means of splines 101. The input transmission shaft 100 is connected to the output shaft of the engine through a clutch, fluid coupling or a torque converter. The output shaft 2 is connected to the input hub 307 of a forward drive multiple disc clutch 302 fixed to an intermediate shaft 350 for the reduction gear input and the sun gear wheel 304 adapted to function as the input member for a forward/reverse changing epicyclic gear 300. The ring gear wheel 303 of the epicyclic gear 300 and the hub 308 of a reverse drive multiple disc brake 301 are fixedly joined together. The carrier 306 functioning as the output member of the epicyclic gear and the intermediate shaft 350 are joined through the cylinder 309 of the forward drive multiple disc clutch.

A ring gear wheel 401 functioning as the input member of a reduction gear 400 is connected to the intermediate shaft 350, while a reduction planetary carrier 402 and an output shaft 500 are joined by means of splines. A sun gear wheel 403 is fixed to the housing. The output shaft 500 is connected to the axle of the vehicle through a differential gear. This transmission gear operates as follows. In forward drive, with the clutch 302 engaged and the brake 301 released, the belt type continuously variable transmission connected to the input of the reduction gear is capable of changing speed within a speed change ratio of 2.0 to 0.5 without employing the epicyclic gear. The reduction ratio of the reduction gear 400 is approximately 1.5. In reverse drive, with the clutch 302 released and the brake 301 engaged to fix the ring gear 303 of the epicyclic gear 300, the carrier 306 functioning as an output member is turned in the reverse direction relative to the sun gear wheel 304 functioning as an input member by the double planetary mechanism, thus the reverse turning is transmitted to the reduction gear 400. The oil chamber 23 for driving the movable flange 22 of the output pulley 20 is defined by a cylinder 24 integrally formed around the periphery of the movable flange 22 and a fixed annular piston 25 which is slidably fitted on the output shaft 2 with its leftward movement (refer to FIG. 1) restrained. The open end of the cylinder 24 formed on the movable flange 22 is enlarged in diameter to form a stepped large-diameter part 24a. The flange 42 of a sleeve 4 having a hub 40 provided with an annular groove 41 formed at the left end (FIG. 1) of the external circumference thereof is fitted in the large-diameter part 24a and fixed by a retaining ring 43 fitted in a groove formed on the interior surface of the large-diameter part 24a. A valve body 6 contains valves of the oil-hydraulic control device which valves selectively introduce or drain pressure oil of the respective pressures regulated depending on the vehicle speed, driving direction, throttle opening and the reduction ratio between the input and output shafts to or from the respective oil-hydraulic servo-mechanisms of the input side pulley, output side pulley, clutch and the brake. The valve body 6 is attached to the bottom part of the V-belt type continuously variable transmission. A reduction ratio valve 66 provided within the valve body 6 provides an output corresponding to the reduction ratio T between the input shaft 1 and the output shaft 2. The reduction ratio valve 66 is disposed with its one end 70a projecting outside from the valve body 6 and comprises lands 71 and 72 forming an oil chamber 70b therebetween and a spool 662 disposed in parallel to the output shaft. A thinned-down part 7e of a reduced diameter is formed at the outer end part of the projecting end portion 70a of the spool for accepting a linkage connecting the movable flange 22 and the spool. Reference numerals 663 to 666 designate oil passages connected to the reduction ratio valve 66.

Figure 2:
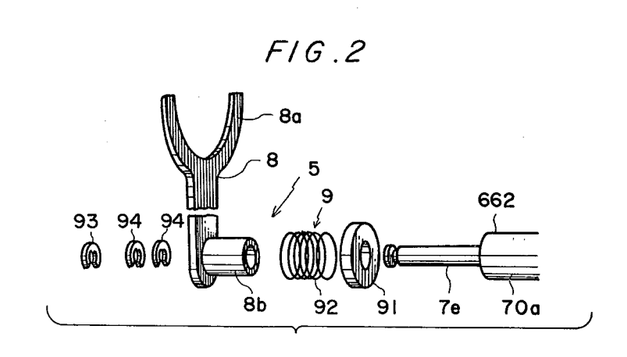
FIG. 2 is an exploded view in perspective of the linkage.

A linkage 5 connecting the movable flange 22 and the torque ratio valve comprises, at one end thereof, a forked part 8a having inner profile of an arc of a circle of a radius of curvature corresponding to that of the bottom surface of the groove 41 and fitted in the groove 41 of the sleeve 4 to retain the sleeve 4 while allowing the turning of the sleeve at the other end thereof, a connecting lever 8 provided with a cylindrical part 8b projecting from the lever 8 so as to receive the thinned-down part 7e projecting from the valve body 6, and a retaining mechanism 9 including a spring seat 91 put on the thinned-down part 7e so as to be pressed against the land 71, a compression spring disposed and compressed between the spring seat 91 and the connecting lever 8, a retaining E-ring 93 fitted in an annular groove formed at the end of the thinned-down part 7e of the spool, and adjusting E-rings 94 inserted between the retaining E-ring and the connecting lever 8 for adjusting the position of the connecting lever 8 relative to the spool 662. A suitable number of adjusting E-rings 94 are provided in assembling the linkage 5 to accurately determine the position of the spool 662 relative to the movable flange 22.

The reduction ratio detecting mechanism of the present embodiment comprises the annular groove 41 formed on the hub 40 movable together with the movable flange 22, the reduction ratio valve 66 and the linkage 5 connecting the hub 40 and the reduction ratio valve 66 and is adapted to transmit the axial movement of the movable flange 22 to the spool 662 by way of the forked part 8a slidably joined with the turning hub 40, the connecting lever 8 and the retaining mechanism 9 comprising the retaining E-ring 94, the compression spring 92 and others. Thus the spool 662 is moved corresponding to the movement of the movable flange 22 to provide reduction ratio pressures corresponding to the displacement or the position of the spool 662.

Figure 3:
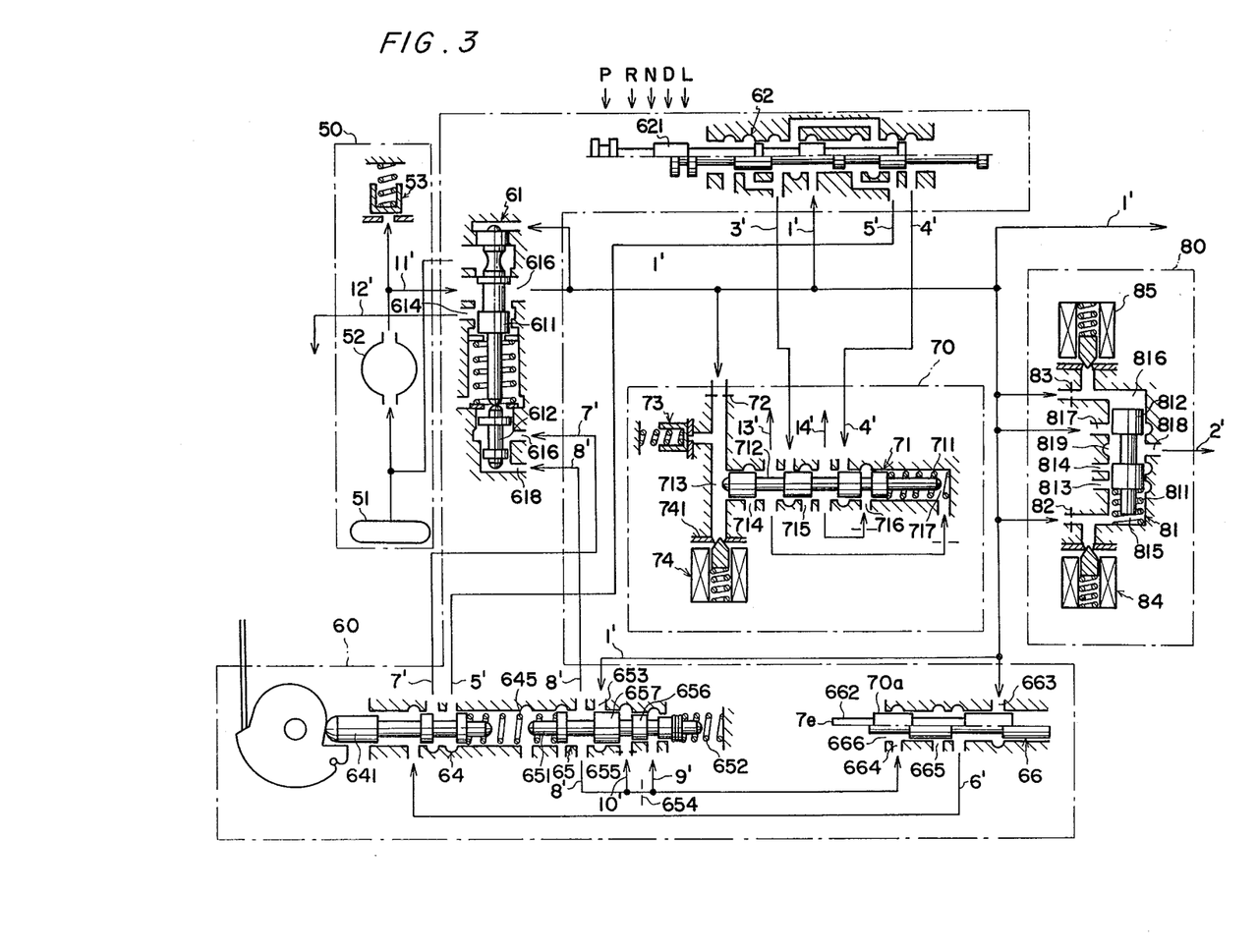
FIG. 3 is a circuit diagram of the oil-hydraulic control device.

The oil-hydraulic control circuit comprises an oil pressure source 50, a shift control mechanism 70 capable of controlling the timing of engagement of the multiple disc brake 301 and the multiple disc clutch 302 of the epicyclic transmission 300 and buffering shocks caused by N to D and N to R shifting, a reduction ratio control mechanism 80 and an oil pressure regulator 60. The oil pressure regulator 60 comprises a manual valve 62 manually operable by means of a shift lever, not shown, detent valve 64 and throttle valve 65 which are adapted to provide detent pressure and throttle pressure respectively corresponding to the throttle opening $\theta$ of the carburetor, the reduction ratio valve 66 interlocked with the movable flange 22 of the output pulley so as to apply the line pressure to the detent valve 64 corresponding to the amount of displacement of the movable flange 22 and to release the oil pressure in an output oil pressure feedback passage 9' provided for the throttle valve 65, and a pressure regulating valve 61 adapted to regulate the pressure of the oil pressure source 50 to provide the line pressure which is applied to the parts of the oil pressure regulator 60.

The oil pressure source 50 pumps up the hydraulic oil through an oil strainer 51 by a pump 52 driven by the engine and supplies the hydraulic oil to the pressure regulating valve 61 through an oil passage 11' including a relief valve 53.

The spool 621 of the manual valve 62 is set to the position P, R, N, D or L corresponding to the shift position of the shift lever P, R, N, D or L, which shift position being manually and selectively determined, thus making the oil passage 1' through which the line pressure is applied to commnicate with output oil passages 3' to 5' as shown in Table 1.

TABLE 1

|  | P | R | N | D | L |
|---|---|---|---|---|---|
| Oil passage 3' | x | x | x | o | o |
| Oil passage 4' | x | o | x | x | x |
| Oil passage 5' | x | o | x | x | o |

Note:
o Communication of the oil passage with the oil passage 1'.
x Isolation of the oil passage from the oil passage 1'.

The pressure regulating valve 61 comprises a spool 611 and a regulator valve plunger 612 responsive to throttle pressure to control the spool 611. The area of a gap opening to a second output port 614 varies according to the displacement of the spool 611. The line pressure is applied to the oil passage 1' through an output port 616. The oil is supplied from the port 614 to the fluid coupling, oil cooler and other units to be lubricated.

The detent valve 64 comprises a spool 641 linked with the throttle opening $\theta$ of the carburetor. With the throttle opening $0 \leq \theta \leq \theta_1$, an oil passage 5' communicates with a detent pressure output oil passage 7' connected to an input port 616' of the regulator valve 61. With the throttle opening $\theta_1 \leq \theta \leq 100\%$, an oil passage 7' communicates with an oil passage 6' connected to the reduction ratio valve 66.

The throttle valve 65 comprises a spool 651 linked in series, at one end thereof, with the spool 641 of the detent valve 64 through a spring 645, while being biased by a spring 652 at the other end thereof. The position of the spool 651 varies according to the variation of the throttle opening transmitted to the spool 651 through the spool 641 and the spring 645 to vary the area of opening of a port 653 communicating with the oil passage 1', thus applying the throttle pressure to the throttle pressure output oil passage 8' connected to an input port 618 of the pressure regulating valve 61. The output oil pressure is fed back to the spool 651 at the land 656 and the land 657 having a pressure receiving area greater than that of the land 656 through output oil pressure feedback oil passages 9' and 10', respectively, branched from the oil passage 8' and provided with orifices 654 and 655 respectively.

Figure 4A:
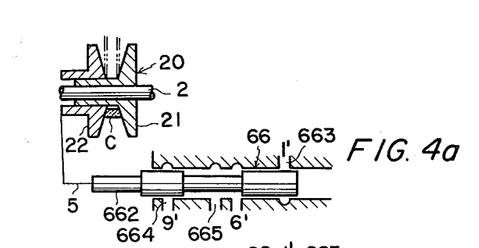
FIGS. 4A, 4B and 4C are shcematic illustrations for facilitating the explanation of the operation of the torque ratio valve.
Figure 4B:
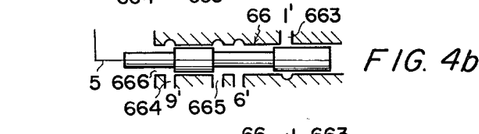
Figure 4C:
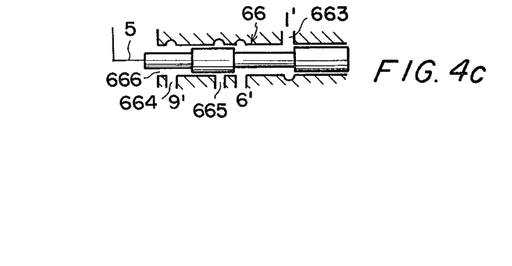

The reduction ratio valve 66 comprises a spool 662 linked with the movable flange 22 of the output pulley 20 through the linkage 5. With the amount of displacement L of the movable flange 22 being $l_3 \leq L \leq l_4$ (reduction ratio T being $t_2 \geq T \geq t_1$), the spool 662 is moved to the left-hand position as shown in FIG. 4A to close the input port 664 connected to the feedback oil passage 9' connected to the throttle valve 65 while allowing the output oil passage 6' connected to the detent valve 64 to communicate with a drain port 665 so that the detent valve 64 is drained. With the amount of displacement L of the movable flange 22 being $l_2 \leq L < l_3$, $l_3$ being a first set value, $(t_3 \geq T > t_2)$, the spool 662 is moved to the intermediate position as shown in FIG. 4B to allow the input port 664 connected to the oil passage 9' to communicate with a drain port 666 so that the oil passage 9' is drained. With the amount of displacement L being smaller than a second set value 2 and within $0 \leq L < l_2$ $(t_4 \geq T > t_3)$, the spool 662 is moved to the righthand position as shown in FIG. 4C to allow a port 663 connected to the oil passage 1' to communicate with an oil passage 6' so that the line pressure is applied to the oil passage 6'. Although the spool 662 is slidably interlocked with the turning movable flange 22 of the output pulley 20, the movement of the movable flange 22 will not be obstructed and the wear of the sliding surfaces moving at a greater relative speed is prevented, since the axial movement of the spool 662 is not impeded by any impedient force provided by springs or oil pressure.

The shift control mechanism 70 comprises a shift control valve 71 having a spool 712 urged by a spring 711 at one end thereof and adapted to receive the line pressure at the other end thereof from an oil chamber 713, an orifice 72 disposed in the oil passage 1' applying the line pressure to the oil chamber 713, a pressure limiting valve 73 disposed between the orifice 72 and the oil chamber 713, and a solenoid valve 74 controlled by an electric control circuit to regulate the oil pressure applied to the oil chamber 713. When the solenoid valve 74 is actuated to open a drain port 741, thereby draining the oil chamber 713, the spool 712 of the shift control valve 71 is moved to the left-hand position by the action of the spring 711 to make an oil passage 13' connected to the oil-hydraulic servo-mechanism which operates the multiple disc clutch 302 of the epicyclic transmission 300 and an oil passage 14' connected to the oil-hydraulic servo-mechanism which operates the multiple disc brake 301 to communicate with drain ports 714 and 715 respectively, so that the oil passages 13' and 14' are drained and the multiple disc clutch 302 or the multiple disc brake 301 is released. With the solenoid valve 74 in unenergized state, the drain port 741 is closed and the spool 712 is moved to the right-hand position by the line pressure applied to the oil chamber 713 to allow the oil passages 3' and 4' to communicate with the oil passages 13' and 14' respectively so that the multiple disc brake 301 or the multiple disc clutch 302 is engaged. In this embodiment, the shift control valve 71 is provided with oil chambers 717 and 716 to which the output oil pressure of the oil passages 13' and 14', respectively, is applied to buff the rising of the output pressure for the purpose of preventing the shock caused at the engagement of the multiple disc clutch and the multiple disc brake.

The reduction ratio control valve 80 comprises a reduction ratio control valve 81, orifices 82 and 83, downshift solenoid 84 and an up-shift solenoid 85. The reduction ratio control valve 81 comprises a spool 812 urged at one end thereof by a spring 811, oil chambers 815 and 816 formed at the respective ends thereof and connected to the oil passage 1' through orifices 82 and 83 respectively, an oil chamber 819 provided with an input port 817 connected to the line 1' to which the line pressure is applied and varying in the area according to the amount of displacement of the spool 812 and an output port 818 connected to the oil-hydraulic servo-mechanism of the input pulley 10 of the V-belt type continuously variable transmission through the oil passage 2', a drain port 814 for draining the oil chamber 819 according to the amount of displacement of the spool 812, and a drain port 813 for draining the oil chamber 815 according to the amount of displacement of the spool 812. The down-shift solenoid 84 and the up-shift solenoid 85 are provided for the oil chambers 815 and 816 respectively and controlled by an electric control circuit, which will be described afterward, to drain the respective oil chambers 815 and 816.

Figure 5:
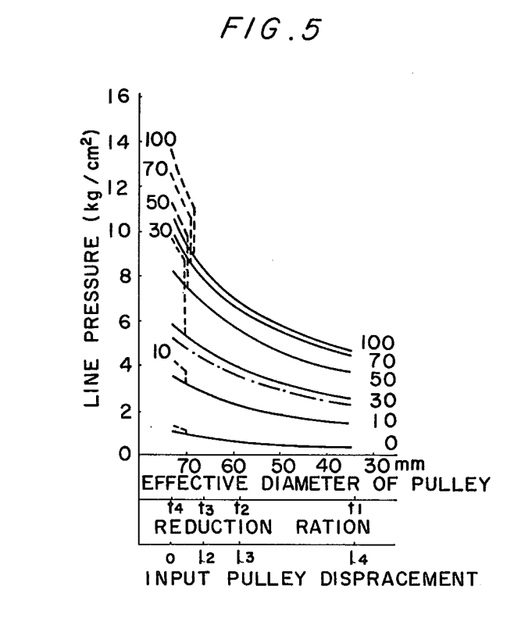
FIG. 5 is a graphical illustration of the respective line pressures of the V-belt type continuously variable transmission.

The hydraulic oil is supplied to the oil-hydraulic control circuit by the pump 52 driven by the engine, therefore, the ratio of the power consumed by the pump 52 to the total power of the engine increases with increase in the line pressure. Accordingly, it is necessary to reduce the line pressure of the oil-hydraulic circuit to the lowest necessary pressure to improve the fuel consumption rate of the engine. In a continuously variable transmission, the line pressure is determined depending on the oil pressure sufficient to secure the power transmission from the input pulley 10 to the output pulley 20 without the slip of the V-belt C. In FIG. 5, continuous lines illustrate the variation of the reduction ratio T between the input and output shafts versus the lowest necessary line pressures using the throttle opening $\theta$ as a parameter when the engine is operated at the optimum fuel consumption rate. Upon starting the vehicle, it is preferable to raise the line pressure to levels shown by broken lines which are higher than the corresponding characteristic curves under the optimum fuel consumption rates shown by the continuous lines by approximately 20%, since the engine cannot be operated under the condition of the optimum fuel consumption rates. Upon applying engine brake, it is preferable to maintain the line pressure characteristics shown by continuous lines even with the throttle opening $\theta$ being zero.

In this embodiment, the line pressure, namely, the output of the pressure regulating valve 61, is controlled by the oil pressure regulator 60 depending on the shift positions of the manual valve 62 (L, D, N. R and P), throttle opening $\theta$ and the reduction ratio between the input and output pulleys (input and output shafts).

D POSITION

In the manual valve 62, only the oil passage 3' communicates with the oil passage 1', while the oil passages 4' and 5' are drained. In this state, in the shift control mechanism, with the shift control solenoid valve 74 remaining unenergized and the line pressure being applied to the oil chamber 713, the spool 712 is moved to the right-hand position to allow the oil passage 3' to communicate with the oil passage 13' so that the line pressure applied to the oil passage 3' acts on the oil-hydraulic servo-mechanism of the multiple disc clutch 302 through the oil passage 13' and the vehicle is ready to be driven forward.

Figure 6:
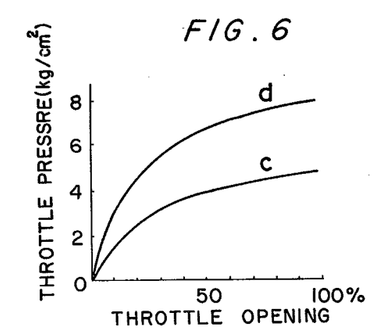
FIG. 6 is a graphical illustration of the throttle pressure.
Figure 7:
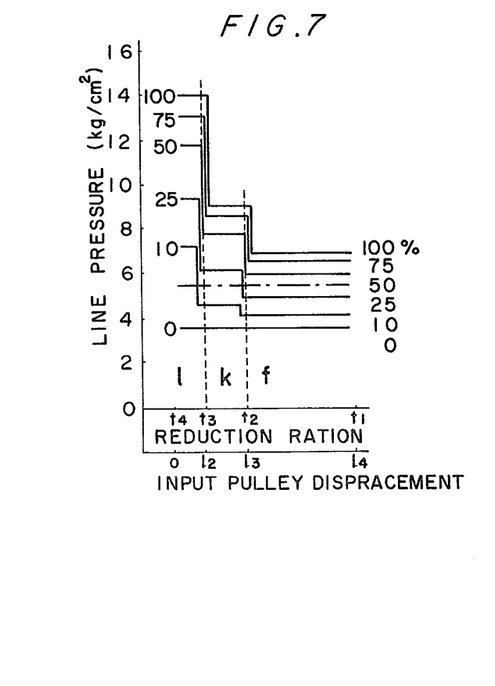
FIGS. 7, 8 and 9 are graphical illustration of the output line pressure of the regulating valve.

(1) Reduction ratio T is in the range $t_1 \leq T \leq t_2$:

Referring to FIG. 4, the reduction ratio valve 66 closes the port 663 connected to the oil passage 1' and the oil passage 6' is drained through the drain port 665. Consequently, the detent pressure (equivalent to the line pressure) is not applied to the oil passage 7' regardless of the throttle opening $\theta$. While in the throttle valve 65, the throttle pressure of a characteristic as shown by a curve (c) in FIG. 6 is applied to the regulator valve plunger 612 of the pressure regulating valve 61 through the oil passage 8', since the port 664 of the reduction ratio valve connected to the oil passage 9' is closed and the feedback pressure is applied to the lands 656 and 657 of the spool 651. Thus, the line pressure provided by the pressure regulating valve 61 is as shown by a curve (f) of FIG. 7 and a curve (e) of FIG. 8.

(2) Reduction ratio T is in the range $t_2 < T \leq t_3$:

Referring to FIG. 4B, in the reduction ratio valve 66, the port 663 is closed and the drain port 666 is communicating with the oil passage 9'. The oil passage 6' is drained through the port 665. Consequently, the detent pressure is not generated and the throttle pressure is increased by a degree corresponding to the cancellation of the feedback pressure from the land 657 of the spool 651 caused by the draining of the oil passage 9' and assumes the characteristic as shown by a curve (d) of FIG. 6. In this state, the line pressure assumes the characteristic as represented by a range (k) of FIG. 7 and a curve (g) of FIG. 8.

(3) Reduction ratio T is in the range $t_3 < T \leq t_4$:

Referring to FIG. 4C, the oil passage 9' is drained through the drain port 666, therefore, the throttle pressure assumes a characteristic the same with that of (2) as represented by a curve (d) of FIG. 6. However, while the throttle opening $\theta$ is in the range $0 \leq \theta \leq \theta_1\%$ and the spool 641 of the detent valve 64 is moved to the left-hand position, the oil passage 6' is closed by the spool 641 and the oil passage 7' is drained from the manual valve 62 through the oil passage 5', since the port 663 is opened to allow the oil passage 1' communicate with the oil passage 6'. When the throttle opening $\theta$ is in the range $\theta_1 < \theta \leq 100\%$, the spool 64 is moved to allow the oil passages 6' and 7' to communicate so that the detent pressure is applied to the oil passage 7'. Consequently, the line pressure assumes a characteristic varying stepwise at $\theta = \theta_1\%$ as shown by a range (l) of FIG. 7 and a curve (i) of FIG. 8.

L POSITION

In the manual valve 62, the oil passages 5' and 1' communicate. The oil passages 3' and 4' remains in the state of D position.

Figure 9:
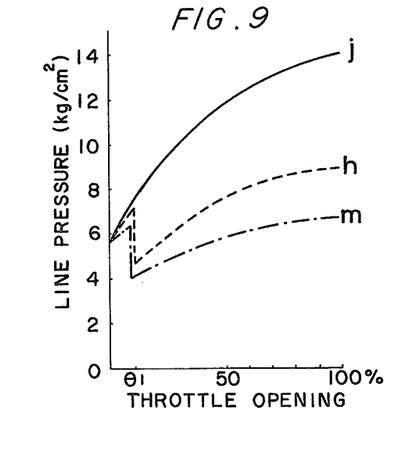

(1) Reduction ratio T is in the range $t_1 \leq T \leq t_2$:

With the throttle opening $\theta$ in the range $0 \leq \theta \leq \theta_1\%$, the oil passages 5' and 7' communicate in the detent valve 64 so that the detent pressure is generated to push up the throttle plunger to generate a high line pressure. When the throttle opening $\theta$ is in the range $\theta_1 < \theta \leq 100\%$, the oil passage 7' is drained through the oil passage 6' and the drain port 665 of the reduction ratio valve, therefore, the detent pressure is not generated and the throttle pressure remains at a level the same with that of D position. Thus, the line pressure assumes a characteristic as represented by a curve (m) of FIG. 9.

(2) Reduction ratio T is in the range $t_2 < T \leq t_3$:

The state of (2) differs from that of (1) in that the oil passage 9' is drained through the drain port 666 of the reduction ratio valve 66 and the throttle pressure provided by the throttle valve 65 and applied to the pressure regulating valve 61 through the oil passage 8' is increased. Thus, the line pressure assumes a characteristic as represented by a curve (h) of FIG. 9.

(3) Reduction ratio T in the range $t_3 < T \leq t_4$:

The oil passage 6' communicates with the oil passage 1' by means of the reduction ratio valve 66, while the oil passage 9' is drained through the drain port 666. The detent valve 64 provides the detent pressure regardless of the throttle opening, since the line pressure is applied both oil passages 6' and 5'. The pressure regulating valve 61 receives the detent pressure and the throttle pressure the same with that of (2) and provides a line pressure as represented by a curve (j) of FIG. 9.

R POSITION

Referring to Table 1, in the manual valve 62, the oil passages 4' and 5' communicate with the oil passage 1' and the oil passage 3' is drained. In this state, when the shift control solenoid valve 74 is unenergized and the line pressures applied to the oil chamber 713 in the shift control mechanism 70, the spool 712 is moved to the right-hand position to allow the oil passage 4' to communicate with the oil passage 14' so that the line pressure in the oil passage 4' is applied to the oil-hydraulic servo-mechanism of the reverse multiple disc brake 301 through the oil passage 14' and the vehicle is ready to be reversed. Furthermore, the line pressure assumes a characteristic the same with that of L position, since the line pressure is applied to the oil passage 5'. In R position, the reduction ratio T of the V-belt type continuously variable transmission 30 is set at the maximum reduction ratio $t_4$. Therefore, the epicyclic transmission 300 need not perform change speed operation (reduction). In the embodiment according to the present invention, line pressure control as in the case of L position is possible even when the reduction ratio T is varied in R position.

P POSITION AND N POSITION

In the manual valve 62, oil passages 3', 4' and 5' are drained. The line pressure, namely, the output of the pressure regulating valve 61, is the same with the line pressure in the case of D position, since the oil passage 5' is drained.

Figure 8:
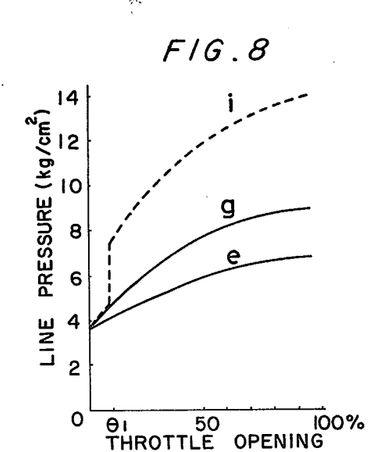

In regulating the line pressure, when the manual valve 62 is shifted to D, N or P position, the line pressure with the reduction ratio T in the range $t_3 < T \leq t_4$ is regulated to lower levels as represented by the characteristic curve (i) of FIG. 8 while the throttle opening is $\theta_1\%$ or less, since maintaining the line pressure would become difficult if excessive oil leakage should occur from various parts of the oil-hydraulic circuit under high oil temperature if the line pressure were regulated to higher levels under an operating mode of the engine, such as idling, wherein the throttle opening $\theta$ is smaller and the output rate of the pump is lower. Furthermore, decrease in the flow rate of the hydraulic oil through the oil cooler would cause the oil temperature to further rise resulting in malfunction of the system. When the manual valve 62 is shifted to L or R position, the line pressure is regulated to higher levels as shown by characteristic curves (h) and (m) of FIG. 9 with the reduction ratio T being in the range $t_1 \leq T \leq t_2$ and the throttle opening $\theta$ being $\theta_1\%$ or less, since a relatively high pressure is required in applying engine brake even when the throttle opening is small. Curves shown by alternate long and short dash lines in FIG. 5 represent the necessary line pressures under such condition as mentioned above. Power loss in the pump 52 can be reduced by regulating the line pressure close to the lowest necessary pressure shown in FIG. 5. Consequently, the fuel cost can be reduced and the specific fuel consumption of the engine improved.

It will be well understood from what has been described hereinbefore that the reduction ratio detecting mechanism of the present invention is capable of accurately detecting the reduction ratio by means of a single connecting lever engaged, at one end thereof, with the groove formed on the movable flange and, at the other end thereof, with the projecting part of the spool of a reduction ratio valve, simple in construction, less liable to malfunction and remarkably durable. Furthermore, use of a spring and adjusting E-rings for joining the spool of the reduction ratio valve and the connecting lever facilitates the positioning of the spool and assembling operation, and reduces the effect of errors in manufacturing the valve body and assembling errors on the reduction ratio pressure. Still further, unnecessary external force will not be applied to the connecting lever and the groove formed on the movable flange for receiving one end of the connecting lever, therefore, wear of the sliding surfaces of the parts is prevented, since the spool of the reduction ratio valve is moved only by the connecting lever and no other external force is applied to the spool.

We claim:

1. In a continuously variable automatic transmission for vehicles having a V-belt continously bariable transmission including an input pulley, an output pulley, each of said pulleys having a fixed flange and a movable flange and adapted to be varied in effective diameter, and a transmission V-belt extended between said input and output pulleys, and an oil hydraulic control device for controlling said V-belt type continuously variable transmission, the improvement comprising a reduction ratio detecting mechanism having a reduction ratio valve with a spool disposed with one end of said spool projecting from a valve body containing said oil hydraulic control device of said V-bept type continuously variable transmission, a connecting lever situated between said movable flange and said reduction ratio valve, said connecting lever engaged at one end to said movable flange, said movable flange capable of rotating the other end of said connecting lever engaged at the projecting end of said spool, the projecting part of said spool connecting to said connecting lever by a cylindrical member and retained to each other by a retaining member attached to the projecting part of said spool, a spring positioned between said spool and said connecting lever, at least one spacer positioned between said retaining member and said connecting lever, making adjustable the relative positions of said movable flange and said spool.

2. In a continuously variable automatic transmission for vehicles having a V-belt type continuously variable transmission including an input pulley, an output pulley, each of said pulleys having a fixed flange and a movable flange and adapted to be varied in the effective diameter, and a transmission V-belt extended between said input and output pulleys, and an oil hydraulic control device for controlling said V-belt type continuously variable transmission, the improvement comprising a reduction ratio detecting mechanism having a reduction ratio valve with a spool disposed with one end thereof projecting from a valve body containing said oil hydraulic control device of said V-belt type continuously variable transmission and a connecting lever between said movable flange and said reduction ratio valve wherein said connecting lever is engaged at one end thereof, with said movable flange to be capable of rotating, and at the other end thereof, with the projecting part of said spool, said spool of said reduction ratio valve being driven solely by said connecting lever, wherein the diameter is the same in all lands, and a chamber located at the other end of said spool is drained of fluid.

* * * * *

UNITED STATES PATENT AND TRADEMARK OFFICE
CERTIFICATE OF CORRECTION

PATENT NO. : 4,482,339

DATED : November 13, 1984

INVENTOR(S) : Nobuaki Miki et al

It is certified that error appears in the above-identified patent and that said Letters Patent is hereby corrected as shown below:

The title page should be deleted to appear as per attached title page.

Signed and Sealed this

Fifteenth Day of October 1985

[SEAL]

Attest:

DONALD J. QUIGG

Attesting Officer

Commissioner of Patents and Trademarks—Designate

United States Patent [19]

Miki et al.

[11] Patent Number: 4,482,339
[45] Date of Patent: Nov. 13, 1984

[54] REDUCTION RATIO DETECTING MECHANISM FOR V-BELT TYPE CONTINUOUSLY VARIABLE TRANSMISSION

[75] Inventors: Nobuaki Miki, Kariya; Norio Sobue; Shoji Yokoyama, both of Anjo, all of Japan

[73] Assignee: Aisin Warner Kabushiki Kaisha, Aichi, Japan

[21] Appl. No.: 296,447

[22] Filed: Aug. 26, 1981

[30] Foreign Application Priority Data

Sep. 4, 1980 [JP] Japan ............... 55-123033

[51] Int. Cl.$^3$ ............... F16H 55/52
[52] U.S. Cl. ............... 474/28; 474/18
[58] Field of Search ............... 74/689; 474/18, 28

[56] References Cited

U.S. PATENT DOCUMENTS

| | | | |
|---|---|---|---|
| 3,015,964 | 1/1962 | Noguchi | 474/28 X |
| 3,044,316 | 7/1962 | Forster | 474/18 X |
| 3,052,132 | 9/1962 | Dittrich et al. | 474/18 |
| 3,110,189 | 11/1963 | Steure | 474/18 |
| 3,395,586 | 8/1968 | Kirchner | 474/28 X |
| 4,369,675 | 1/1983 | Van Deursen | 474/28 X |

FOREIGN PATENT DOCUMENTS

| | | | |
|---|---|---|---|
| 2703488 | 8/1977 | Fed. Rep. of Germany | 474/28 |
| 2752322 | 6/1978 | Fed. Rep. of Germany | 474/18 |
| 2033502 | 5/1980 | United Kingdom | 474/18 |
| 2080892 | 2/1982 | United Kingdom | 474/18 |

Primary Examiner—Allan D. Herrmann
Assistant Examiner—Stephen B. Andrews
Attorney, Agent, or Firm—Cooper, Dunham, Clark, Griffin & Moran

[57] ABSTRACT

A reduction ratio detecting mechanism for V-belt type continuously variable transmission of this invention comprising a spool disposed with one end thereof projecting from a valve body containing said oil-hydraulic controller of said V-belt type continuously variable transmission and with the axis thereof in parallel with the axis of either one of said input and output pulleys and capable of providing a reduction ratio pressure corresponding to the amount of displacement of said spool, said reduction ratio pressure being applied to said oil-hydraulic controller, wherein the movable flange of said input pulley or said output pulley and said reduction ratio valve are connected by a connecting lever which is engaged, at one end thereof, with said movable flange so as to allow the turning of said movable flange and, at the other end thereof, with the projecting part of said spool, is capable of directly and accurately detecting the reduction ratio between the input and output shafts.

2 Claims, 11 Drawing Figures